(12) United States Patent
Haws

(10) Patent No.: US 10,220,888 B2
(45) Date of Patent: Mar. 5, 2019

(54) ANGLED CLAMP ASSEMBLY FOR MOUNTING PANELS TO I-BEAMS

(71) Applicant: Laydon Composites Ltd., Oakville (CA)

(72) Inventor: James D. Haws, Oakville (CA)

(73) Assignee: Laydon Composites Ltd., Oakville (CA)

( * ) Notice: Subject to any disclaimer, the term of this patent is extended or adjusted under 35 U.S.C. 154(b) by 0 days.

(21) Appl. No.: 15/298,200

(22) Filed: Oct. 19, 2016

(65) Prior Publication Data

US 2018/0105214 A1   Apr. 19, 2018

(51) Int. Cl.
| | |
|---|---|
| *B62D 35/00* | (2006.01) |
| *F16B 2/12* | (2006.01) |
| *F16B 2/06* | (2006.01) |
| *B62D 35/02* | (2006.01) |
| *F16B 2/14* | (2006.01) |
| *B62D 37/02* | (2006.01) |
| *F16B 5/06* | (2006.01) |

(52) U.S. Cl.
CPC ............ *B62D 35/001* (2013.01); *B62D 35/02* (2013.01); *F16B 2/065* (2013.01); *F16B 2/12* (2013.01); *F16B 2/14* (2013.01); *B62D 35/008* (2013.01); *B62D 37/02* (2013.01); *F16B 2/06* (2013.01); *F16B 5/0685* (2013.01)

(58) Field of Classification Search
CPC .......... F16B 2/12; F16B 2/065; F16B 7/0493; F16B 2/14; F16B 9/023; B62D 35/001; B62D 35/02; B62D 21/09; B62D 35/008

USPC ... 248/72, 228.1, 228.3, 228.5, 231.41, 317; 296/180.1, 180.4, 184.1

See application file for complete search history.

(56) References Cited

U.S. PATENT DOCUMENTS

| | | | |
|---|---|---|---|
| 1,281,531 A | 10/1918 | Dietrich | |
| 1,658,956 A | 2/1928 | Wehr | |
| RE17,629 E | 3/1930 | Wehr | |
| 1,768,543 A * | 7/1930 | Clausing | E04B 9/18 248/228.3 |
| 2,049,893 A | 8/1936 | Chiconine | |
| 2,055,285 A * | 9/1936 | Ford | B60Q 1/26 248/300 |
| 2,076,106 A | 4/1937 | Wehr | |
| 2,911,690 A * | 11/1959 | Sanford | E04B 1/2608 248/214 |
| 3,189,308 A * | 6/1965 | Schaefer | F16M 13/02 248/214 |
| 3,401,953 A | 7/1968 | Prohl | |
| 3,465,995 A * | 9/1969 | Whitman | B25B 5/08 248/228.3 |
| 3,711,146 A | 1/1973 | Madzsar | |
| 4,021,991 A | 5/1977 | Hotz | |

(Continued)

*Primary Examiner* — Jonathan Liu
*Assistant Examiner* — Taylor L Morris
(74) *Attorney, Agent, or Firm* — Warner Norcross & Judd LLP

(57) ABSTRACT

A clamp assembly is provided for securing a panel or fairing to an I-beam, and comprises a pair of side blocks and a clamping block having a central body and a flat surface at at least one end of the central body. The side blocks and the clamping block are secured together using a single bolt. The flat surface at the end of the central body is positioned at an angle to the central body, so as to provide an angled surface for mounting of a fairing.

13 Claims, 6 Drawing Sheets

(56) References Cited

U.S. PATENT DOCUMENTS

| | | | |
|---|---|---|---|
| 4,230,416 A * | 10/1980 | Gilb | E04B 1/2612 248/300 |
| 4,262,953 A | 4/1981 | McErlane | |
| 4,367,972 A | 1/1983 | Panthout | |
| 4,486,046 A | 12/1984 | Whitney | |
| 4,518,188 A | 5/1985 | Witten | |
| 4,611,847 A | 7/1986 | Sullivan | |
| 4,640,541 A | 2/1987 | Fitzgerald | |
| 4,746,160 A | 5/1988 | Wiesmeyer | |
| 5,042,217 A * | 8/1991 | Bugbee | E04B 1/2612 403/170 |
| 5,280,990 A | 1/1994 | Rinard | |
| 5,457,928 A * | 10/1995 | Sahnazarian | E04B 1/2612 403/232.1 |
| 5,549,049 A | 8/1996 | Deandrea | |
| 5,609,384 A | 3/1997 | Loewen | |
| 5,794,897 A | 8/1998 | Jobin | |
| 5,839,760 A | 11/1998 | Johnson | |
| 5,921,617 A | 7/1999 | Loewen | |
| 5,947,520 A | 7/1999 | McHorse | |
| 6,152,511 A | 11/2000 | Gustafson | |
| 6,171,540 B1 | 1/2001 | Ibaragi | |
| 6,217,107 B1 | 4/2001 | Langlois | |
| 6,254,306 B1 * | 7/2001 | Williams | E04B 1/2403 403/403 |
| 6,257,655 B1 | 7/2001 | Selby | |
| 6,460,821 B1 * | 10/2002 | Rhudy | H01Q 1/1221 248/237 |
| 6,644,720 B2 | 11/2003 | Long | |
| 6,837,536 B1 | 1/2005 | Schwartz | |
| 6,932,419 B1 | 8/2005 | McCullough | |
| 6,974,178 B2 | 12/2005 | Ortega | |
| 7,093,889 B2 | 8/2006 | Graham | |
| 7,578,541 B2 | 8/2009 | Layfield | |
| 7,604,284 B2 | 10/2009 | Reiman | |
| 7,690,168 B2 * | 4/2010 | LaLonde | E04B 9/30 52/220.6 |
| 7,740,303 B2 * | 6/2010 | Wood | B62D 35/001 296/180.1 |
| 7,748,772 B2 | 7/2010 | Boivin | |
| 7,780,224 B2 | 8/2010 | Roush | |
| 7,837,254 B2 | 11/2010 | Reiman | |
| 7,887,120 B2 | 2/2011 | Boivin | |
| 7,938,475 B2 | 5/2011 | Boivin | |
| 7,942,467 B2 | 5/2011 | Boivin | |
| 7,942,468 B2 | 5/2011 | Boivin | |
| 7,942,469 B2 | 5/2011 | Boivin | |
| 7,942,470 B2 | 5/2011 | Boivin | |
| 7,942,471 B2 | 5/2011 | Boivin | |
| 8,025,330 B2 | 7/2011 | Reiman | |
| D649,090 S | 11/2011 | Boivin | |
| 8,061,672 B1 * | 11/2011 | Kaufman | E04B 2/82 248/228.3 |
| 8,167,258 B1 * | 5/2012 | Wentworth | E04B 1/2403 248/214 |
| 8,186,745 B2 | 5/2012 | Graham | |
| 8,215,075 B2 * | 7/2012 | Bergman | E04B 9/20 248/324 |
| 8,303,025 B2 | 11/2012 | Senatro | |
| 8,376,450 B1 | 2/2013 | Long | |
| 8,413,937 B2 | 4/2013 | DiFranco | |
| 8,579,359 B2 | 11/2013 | Brown | |
| 8,608,122 B2 | 12/2013 | Mancina | |
| 8,678,473 B2 | 3/2014 | Dayton | |
| 8,727,425 B1 * | 5/2014 | Senatro | B62D 35/001 180/903 |
| 8,777,169 B2 * | 7/2014 | Raye | B60T 7/20 248/229.1 |
| 8,814,253 B1 | 8/2014 | Butler | |
| 8,919,863 B2 | 12/2014 | Layfield | |
| 2005/0279901 A1 * | 12/2005 | McCoy | E04B 2/82 248/300 |
| 2008/0061598 A1 | 3/2008 | Reiman | |
| 2008/0093887 A1 | 4/2008 | Wood | |
| 2008/0238139 A1 | 10/2008 | Cardolle | |
| 2008/0310913 A1 | 12/2008 | Urban | |
| 2009/0218848 A1 | 9/2009 | Boivin | |
| 2010/0066123 A1 | 3/2010 | Ortega | |
| 2010/0096881 A1 | 4/2010 | Boivin | |
| 2010/0096882 A1 | 4/2010 | Boivin | |
| 2010/0264690 A1 | 10/2010 | Brown | |
| 2010/0264691 A1 * | 10/2010 | Giromini | B62D 25/168 296/180.4 |
| 2011/0219719 A1 * | 9/2011 | Stol | F16B 2/065 52/588.1 |
| 2012/0025038 A1 * | 2/2012 | Seelman | F24S 25/70 248/125.7 |
| 2012/0211617 A1 * | 8/2012 | Mancina | B62D 35/001 248/231.31 |
| 2012/0319428 A1 * | 12/2012 | Wood | B62D 35/001 296/180.4 |
| 2013/0285411 A1 * | 10/2013 | Layfield | B62D 35/02 296/180.4 |
| 2014/0300134 A1 * | 10/2014 | Gerst | B62D 35/001 296/180.4 |
| 2015/0259014 A1 * | 9/2015 | Baker | B62D 35/001 296/180.4 |
| 2016/0096558 A1 | 4/2016 | Bassily | |
| 2017/0066487 A1 | 3/2017 | Boivin | |

* cited by examiner

ANGLED CLAMP ASSEMBLY FOR MOUNTING PANELS TO I-BEAMS

FIELD OF THE INVENTION

This invention relates to clamp assemblies, and in particular to clamp assemblies whose purpose is to secure a panel that subtends from an I-beam. In a particular use and embodiment of the present invention, a plurality of clamp assemblies is employed to secure a cargo trailer fairing to each side of a cargo trailer beneath the floor thereof, so as to improve the aerodynamic properties of the cargo trailer, and thereby improve the fuel consumption of the road tractor which is towing the cargo trailer. A particular feature of the present invention is that it permits the installation of trailer fairings installed at an angle to the trailer I-beams, with the expenditure of minimal time and labour.

BACKGROUND OF THE INVENTION

In our previous invention, published as U.S. Pat. No. 8,608,122, the entire contents of which are hereby incorporated by reference, a device was disclosed which provided a means for rapidly and easily securing panels of various sorts, to I-beams. In particular, such securement was primarily developed so as to provide easier and faster mounting of trailer fairings to the sides of cargo trailers, and thereby improve the aerodynamic characteristics of the cargo trailers to which the trailer fairings are mounted.

As discussed in that earlier document, prior art devices for mounting trailer fairings at the ends of I-beams on the underside of cargo trailers have traditionally required the careful placement of a plurality of support structures to hold the fairings in place. These were typically mounted to the trailer using a system of two or more plates held with at least four bolts, at the end of each I-beam, and the attachment of an additional two bolts at the bottom of the trailer fairing. However, those skilled in the art are aware that proper placement and installation of each such assemblies requires considerable time, and typically involves handling a not inconsiderable weight. As such, one or two skilled mechanics might be needed to install those devices and this adds to the overall cost of installing these types of devices.

The device described in U.S. Pat. No. 8,608,122 however, provided a mounting clamp assembly which could be used to create a wedging action that secures the assembly to the I-beam. In use, the clamp assembly could be pre-assembled and then fitted to the I-beam by simply tightening one bolt. As such, the device could be easily mounted into position on the I-beam and tightened to provide a secure mounting assembly for the fairing. A significant reduction in installation time, and cost, was provided by this device.

As part of that device, a central clamping block was provided having a flat surface at one end of a central body, which flat surface was used for attachment of the fairing to the clamping assembly. This approach was of most benefit for installation of fairings which were straight, and which extended longitudinally down the sides of the cargo trailer. As a result, the fairings were easily installed in a manner wherein the fairing is mounted perpendicular to the trailer I-beams.

However, fairings are now frequently installed at an angle to the trailer. In one angled fairing approach, the two fairings on the two sides of the trailer are straight, but they converge as they approach the front of the trailer. Alternatively, some fairings are designed to have a section straight along the edge of the trailer, but curve inwardly as they approach the front of the trailer. In either case, at least part of the fairings are now installed at an angle to the trailer. Other approaches are also known wherein curved fairings are installed under the trailer, and thus, the use of a perpendicular flat surface is not always possible.

As a result, all or at least parts of these types of fairings are no longer installed simply in a manner wherein the flat surface of the clamping assembly can be positioned perpendicular to the I-beams.

Use of the device provided in U.S. Pat. No. 8,608,122 has therefore been made more difficult since that device was primarily intended for use with a flat surface which is perpendicular to the longitudinal axis of the I-beams.

Moreover, the previous design also utilized the fact that the main supporting structure of the clamping assembly generally extended along the axis of the I-beam, and as such, the I-beam provided support to the device. Installing the clamping assembly at an angle, so that the flat surface followed the angled orientation of the fairing, twisted the device on the I-beam so that the I-beam no longer provided support along the entire length of the clamping assembly central body. As a result, some support for the clamping assembly is lost since this arrangement could allow the support structure to twist and loosen when the fairing is subjected to accidental impact, or by wind forces under the trailer. Additionally, installation of the clamping assembly is made more difficult since the entire clamping assembly can no longer be placed directly on the I-beam.

It would therefore be beneficial to provide a fairing clamping assembly which can be easily and rapidly installed on a wide variety of I-beams, in a manner such that the flat surface for mounting of the fairing is not perpendicular to the I-beams, and wherein the flat surface of the clamping assembly is provided at an angle to the I-beams even though the main supporting structure of the clamping assembly still rests essentially completely on the central longitudinal axis of the I-beam.

SUMMARY OF THE INVENTION

The advantages set out hereinabove, as well as other objects and goals inherent thereto, are at least partially or fully provided by the clamping assembly of the present invention, as set out herein below.

In accordance with one aspect of the present invention, there is provided a clamp assembly for securing a panel to an I-beam wherein the plane of the flat surface panel and the longitudinal axis of the I-beam are at an angle, one to the other.

Preferably, the clamp assembly is one similar to the clamp described and claimed in U.S. Pat. No. 8,608,122, and for convenience, the present discussion will be directed towards modification of that device. However, the skilled artisan will be aware that the present invention can be applied to other similar devices.

In the preferred device, the clamping assembly comprises a clamping block with inclined surfaces, and a pair of side blocks with a wedge-shaped surfaces, wherein the wedge-shaped surfaces on the side blocks acts on the inclined surfaces of a central body of a clamping block so as to create a wedging force. The wedging force, or action, acts to secure the clamp assembly to a pair of opposed flanges on an I-beam. The angled flat surface is located at at least one end of the central body, and that flat surface acts as the angled flat surface for angled mounting of the fairing.

As such, the clamping block is manufactured so that at least one end of the clamping block provides a flat surface which is angled to the central body. The angle between the flat surface and the central body can be any suitable, non-perpendicular angle. Preferred angles range from 5° to 75°, more preferably, from 7.5° to 60°, and still more preferably from 10° to 45°.

Either end of the central body can have the angled flat surface. However, preferably, both ends of the clamping block have flat surfaces which are at an angle. This approach allows the clamping block to be reversible so that the same clamping block can be used on either the left or right side of the trailer. Also, while the angles for the flat surfaces can vary from one end to the other, preferably, the angles for both flat surfaces, is the same in opposite directions.

As in U.S. Pat. No. 8,608,122, the side blocks are each preferably in the shape of an inverted "L", and each has upper and outer side surface, and end surfaces, all in mutually perpendicular relationship. A bottom surface is parallel to the upper surface, and a lower clamping surface is parallel to the upper surface. There is optionally also a series of corrugations which may be provided on each lower clamping surface of each of the side blocks to aid in securing the side blocks to the I-beam. Importantly, each side block includes an inclined wedge surface extending downwardly and outwardly from its intersection with the lower clamping surface to its intersection with the bottom surface.

The single clamping block preferably has a central body with a pair of sloping wedge surfaces along the sides of the central body. Each of the sloping wedge surfaces slopes downwardly and inwardly along at least a portion of the length of the central body, from its respective intersection with an upper surface of the central body to a respective intersection with a bottom surface thereof.

As in the device in U.S. Pat. No. 8,608,122, preferably, a single bolt is provided to attach the clamping assembly to the I-beam. Each side block and typically the central body, has at least one set of aligned openings, which is or which are formed through the side block and central body so that the inclined wedge surfaces of the side blocks act on the sloping wedge surfaces of the central body to create a wedging force that clamps the clamp assembly to an I-beam. The side blocks are fitted around the clamping block, and the I-beam, in the manner described in U.S. Pat. No. 8,608,122.

The opening or openings in the side blocks and clamping block, are adapted to receive the bolts, or preferably, a single bolt which bolt is tightened so as to create the wedging action that securely attaches the clamping assembly to the I-beam. In a preferred embodiment, one to three openings are provided in the clamp assembly, and a single bolt, through any one of the openings, is used to clamp the assembly together and to the I-beam.

At least one end, the central body has a flat surface which preferably extends across and more preferably beyond, the central body, and which acts as a flat surface for attachment of a fairing. In the present invention, the flat surface of the clamping block is angled with respect to the central body, so as to provide the previously described angle between the flat surface and the central body.

In one preferred option, both ends of the central body have flat surfaces wherein both flat surfaces are angled. The angle for each flat surface can be different so that the clamping block can be reversed to provide a flat surface having a different angle.

An optional outer face, or an added fairing attachment surface, can also be provided or attached to the flat surface, which is substantially co-planar to the flat surface, and additional openings (such as slots or the like), can be provided on the outer face or attachment surface. These additional openings are provided so as to allow increased flexibility in attaching the clamping block to the fairing panel, in situations where the I-beams are not all in alignment. This might be the case where the trailer uses I-beams of different depths for additional strength at some parts of the trailer, and thus, the openings provided in the outer surface of the clamping block may not all be in alignment.

Similarly, the attachment surface provides additional flexibility in designing the fairing attachment mechanism to accommodate various fairing attachment parameters. In particular, the attachment surface can be attached to the flat surface at either end of the central body. This can be accomplished using any suitable attachments means, including screws, bolts rivets, or the like, or the attachment surface can be snap-fitted to the flat surface using resilient plastic snaps, or the like.

When using the attachment surface, the skilled artisan will be aware that the flat surface at the end of the central body, may not be perfectly flat. However, the attachment surface, once attached, will now provide the flat surface required for attachment of the fairing.

In operation, the clamping block is in a generally horizontal disposition, and still extends essentially along the central longitudinal axis of the I-beam. Also, even though the flat surface is provided at an angle to the clamping block (and I-beam), it is still preferably in a generally vertical disposition.

Openings can also be provided on the flat surface, or the attachment surface, so that a fairing panel can be secured to the clamping block, by passing securing means through the thickness of the panel and through the opening or openings in the flat surface or attachment surface.

Accordingly, in one aspect, the present invention provides a clamp assembly for securing a panel to an I-beam by a wedging action between side blocks and a clamping block, wherein said clamping block comprises a central body and a flat surface at at least one end of the central body, and which flat surface extends across, and more preferably extends beyond, the end of the central body, and which flat surface acts as an attachment point for attachment of a fairing to the clamp assembly, characterized in that said flat surface of the clamping block is angled with respect to the central body, so as to provide a non-perpendicular angle between the flat surface and the central body.

Preferably, the clamping assembly is of the type comprising:

a pair of side blocks each preferably being generally in the shape on an inverted "L", and each having an upper and outer side surface, and end surfaces, all in mutually perpendicular relationship, a bottom surface parallel to said upper surface, a lower clamping surface parallel to said upper surface, and an inclined wedge surface extending downwardly and outwardly from its intersection with said lower clamping surface to its intersection with said bottom surface;

a single clamping block having a central body having an upper surface, a bottom surface, and a pair of sloping wedge surfaces along the central body, each of which slopes downwardly and inwardly along at least a portion of the length of the central body, its respective intersection with said upper surface of the clamping block to a respective intersection with the bottom surface thereof; and wherein each side block and optionally said central body has at least one aligned opening formed therethrough, through which aligned opening a bolt can be passed and tightened so as to create a wedging force, and thereby induce a clamping action between the upper surface of the clamping block and a bottom surface of the I-beam to which said clamp assembly is attached.

DETAILED DESCRIPTION OF THE INVENTION

In the present application, the term "panel" refers primarily to a cargo trailer fairing, and the present application is primarily directed to this application. However, the skilled artisan will be aware that a clamp assembly for use on an I-beam can be used in a wide variety of applications. Accordingly, while the present application is described with particular reference to the cargo trailer fairing industry, the skilled artisan would be aware that the present application is equally applicable in other applications.

Moreover, it will be noted that in the following discussion, that unless otherwise specifically noted, all of the features described herein may be combined with any of the various aspects described herein, in any combination.

The clamping assembly of the present invention can be used in situations where the fairing is not intended to be placed in a manner that it would be perpendicular to the I-beam. This would include situations wherein the fairing is angled inwards on the trailer, or wherein the fairing is curved or bent inwards on the trailer. The clamping assembly of the present invention can also be used on angled or bent sections of a fairing, while the clamping assembly described in U.S. Pat. No. 8,608,122 can be used on other sections of the fairing when they are positioned so as to be perpendicular to the trailer.

Further, preferably, the clamping block of the present invention is interchangeable with the corresponding clamping block of the device shown in U.S. Pat. No. 8,608,122 so that the same side blocks can be used for either clamping block.

Additionally, clamping blocks can be provided to the user which have flat surfaces angled at a variety of different angles so that the clamping block with the "best fit" flat surface can be selected for that fairing, depending on the installation parameters.

With respect to the fairings, it should also be noted that the fairings of the sort that are contemplated by the present invention for mounting to cargo trailers using the clamp assembly disclosed herein, can be modular in design and construction so that a given number of fairing panels, which are generally all alike one to another, may be easily mounted or secured to a cargo trailer. In this modular design, up to five to ten, or more, modular panels (which may be interconnected) may be employed, per side of the trailer. Typically though, depending on the length of the cargo trailer and the placement of the wheel bogies thereunder, a single sheet of fairing material is commonly used on each side of the trailer.

Further, it will be clear that the clamp assembly of the present invention is readily and easily installed on new trailers, but can be easily retrofitted to older trailers, and the like. As such, it will also be understood, of course, that the clamp assemblies of the present invention may be employed in their particularly intended use with cargo trailers of any age.

Also, as was described in U.S. Pat. No. 8,608,122, it will also be clear that use of the clamping assembly of the present invention precludes the necessity for drilling or welding of any sort when mounting any panel whatsoever to the end of an I-beam. This is particularly important in the intended use of the clamp assembly of the present invention when mounting trailer fairings to cargo trailers, because considerable time and labour costs are saved, and because the integrity of the I-beams to which the trailer fairings are attached is not compromised in any manner whatsoever.

Still further, it will become evident that it is a simple matter to use the clamping assembly of the present invention to replace a damaged fairing, or any one of a series of modular panels forming a trailer fairing, if required. This can also include replacement of any damaged prior art clamp assemblies which secure the sheet or modular fairing panels to a cargo trailer, without the necessity of having to do any significant work on any adjacent clamps and/or modular panels.

The clamp assemblies can be made of any suitable materials. Preferably, the material of the trailer fairings themselves, should embody the characteristics of rigidity and yet, provide a certain amount of flexibility. The rigidity of the clamp assembly in keeping with the present invention therefore comes as a matter of design. Furthermore, employment of a ribbed structure as is well known to those skilled in the art, is typically of benefit.

Likewise, rigidity and yet flexibility of modular panels of a trailer fairing, comes as a consequence of the employment of a suitable material of a suitable thickness, as is well-known to those skilled in the art, optionally together with the employment of a suitable flexible brace or strut.

In normal manufacturing of the clamp assembly, typically, each of the side blocks and the clamping block is preferably formed from a plastics material; and the plastics material may be chosen from the group consisting of high-density polypropylene, high-density polyethylene, nylon, vinyl, and polymers, co-polymers, glass or fibre reinforced composite materials, and mixtures thereof. Generally, the side blocks and the clamping block are essentially rigid, meaning that there is little or no compression or flexing of the blocks, in normal use. A preferred material is a thermoplastic olefin (TPO), which is typically a polymer/filler blend usually consisting of some fraction of PP (polypropylene), PE (polyethylene), BCPP (block copolymer polypropylene), rubber, and a reinforcing filler. Common fillers include, though are not restricted to talc, fiberglass, carbon fiber, wollastonite, and MOS (Metal Oxy Sulfate). Common rubbers include EPR (Ethylene propylene rubber), EPDM (EP-diene rubber), EO (ethylene-octene), EB (ethylene-butadiene), SEBS (Styrene-ethylene-butadiene-styrene). One preferred material is a talc-filled thermoplastic elastomer available as Polytrope TPP, or the like.

Typically, each of the side blocks and the clamping block is injection moulded with a plurality of recesses formed therein so as to create a plurality of ribs therebetween, and thereby so as to increase the rigidity and decrease the weight thereof.

For cost and weight purposes, use of metal materials, for the side and/or clamping blocks, such as iron, steel, or aluminum, is not generally preferred, but their use is not excluded.

Additional openings are also preferably provided on the clamping assembly for attachment of a brace, strut, support bar, planar strap, wire, chain, or other fairing support device that extends downward from the clamping assembly, and which can be attached to the lower section of the fairing panel. This provides additional support for the fairing panel, when in use.

The strut, or the like, is also preferably made of a plastic material which is chosen so as to be resiliently flexible, while having sufficient rigidity to hold the panel essentially solidly in place in normal use, but provide some ability to flex when the panel is inadvertently contacted with other objects during minor impacts (e.g. striking a curb at low speeds). Moreover, it should be noted that a resiliently flexible strut, or the like, can assist in pulling the panel back into the proper shape, should it be deflected out of shape.

In a further aspect, the present invention therefore provides a clamping assembly, as previously described, used in combination with a strut, or similar fairing support device.

When the clamp assembly of the present invention is in operation, a plurality of clamp assemblies with attached fairing support devices, are secured to a plurality of I-beams at the under surface of a cargo trailer, so as to secure a trailer fairing in place below the cargo trailer.

As such, in a further aspect, the present invention also provides a fairing mounting system comprising a plurality of clamping assemblies as herein described, in combination with a fairing, which is adapted to be mounted to the I-beams on a cargo trailer.

The clamp assemblies of the present invention can also preferably be rapidly attached to the I-beams preferably using only one bolt, and when in place, the clamp assemblies provide a suitable device for attachment of cargo trailer side fairings, and, thus, provide a rapid method to improve the aerodynamic properties of the cargo trailer, and thus reduce fuel consumption when the cargo trailer is being towed by a suitable road tractor.

It should be noted that the bolts for holding the clamp assembly together, and any other securing means for attaching a planar strap, or a fairing panel, which is employed by the present invention may be made from any material suitable for the intended use. Typically, these materials are chosen from the group consisting of stainless steel, nickel plated steel, zinc plated steel, nylon, titanium, and combinations thereof, although bolts made of plastic or other materials are not excluded.

Further, it also be noted that the materials employed in the manufacture of clamp assemblies in keeping with the present invention, as well as the trailer fairings for which their particular purpose is intended, are such that they will withstand extreme temperatures which may range from −60° C. up to +90° C., but more typically, from −40 to +60° C.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention.

Embodiments of this invention will now be described by way of example only in association with the accompanying drawings in which.

DETAILED DESCRIPTION OF THE PREFERRED EMBODIMENTS

Figure 1:
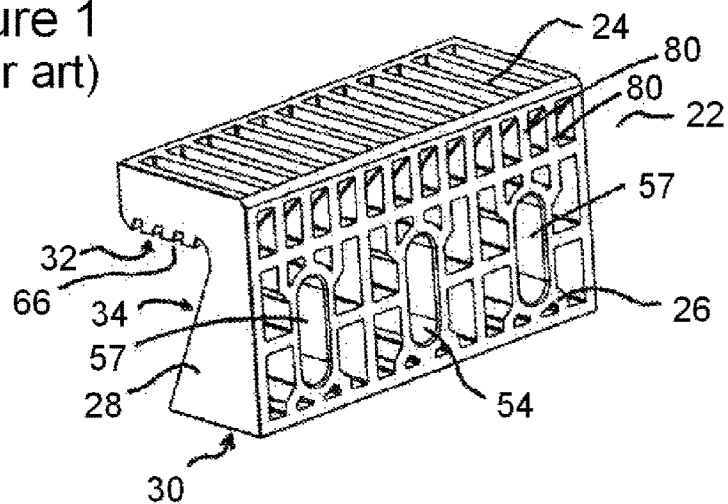
FIG. 1 is a side block of the prior art, as shown in U.S. Pat. No. 8,608,122.

The novel features which are believed to be characteristic of the present invention, as to its structure, organization, use and method of operation, together with further objectives and advantages thereof, will be better understood from the following discussion. It will be noted that, in the drawings, like reference numerals depict like elements.

Applicant refers first to FIGS. 1 to 6 which shows the prior art clamping assembly described in U.S. Pat. No. 8,608,122. It can be noted the clamp assemblies in keeping with that invention, or the present invention, may find other uses, but the use of the clamping assemblies to secure fairings to a cargo trailer is their principal intended use.

In general, a plurality of I-beams are found beneath the floor of a cargo trailer, in a manner such that the trailer floor is secured to the upper horizontal flat portion of the I-beams. Thus, the lower horizontal flat portions of the I-beams are freely accessible, so as to permit securement of the clamping assemblies of the present invention.

Figure 2:
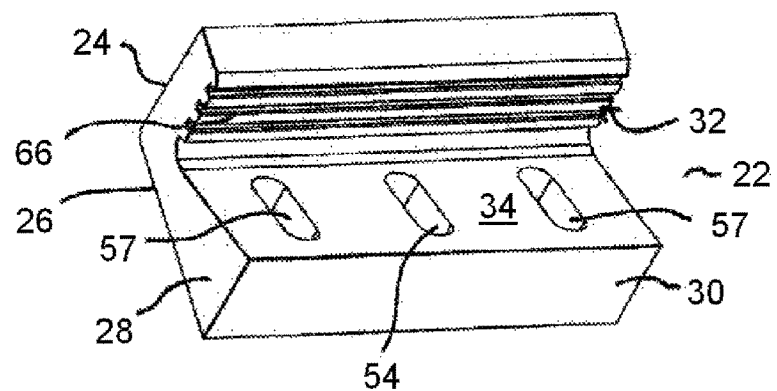
FIG. 2 is a further view of the side block of FIG. 1.
Figure 3:
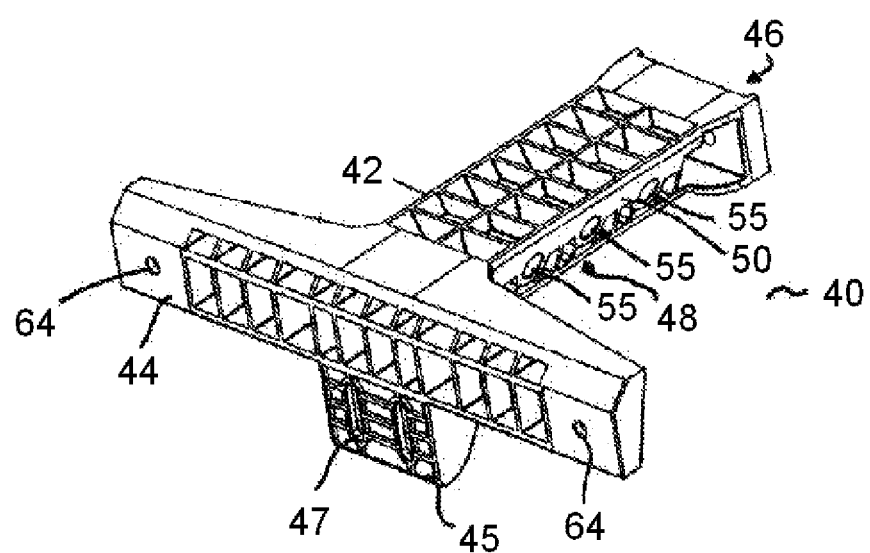
FIG. 3 is a perspective view of a clamping block of the prior art, as shown in U.S. Pat. No. 8,608,122.
Figure 4:
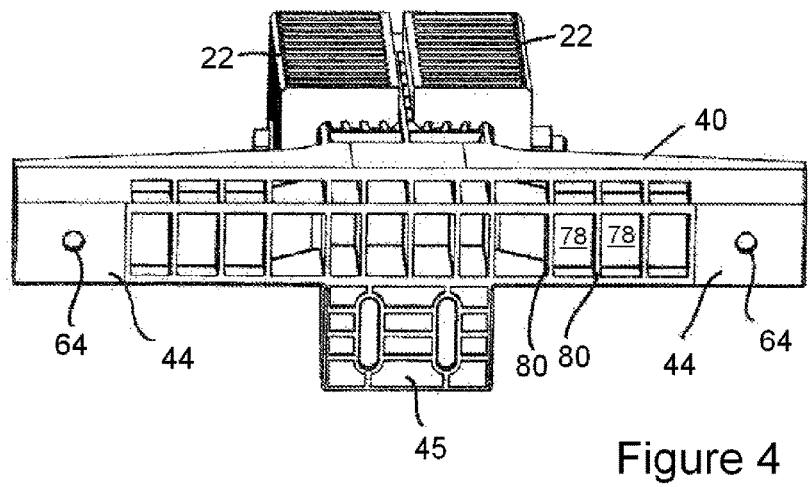
FIGS. 4 and 5 are front and top view of a clamping assembly of the prior art, as shown in U.S. Pat. No. 8,608,122.
Figure 5:
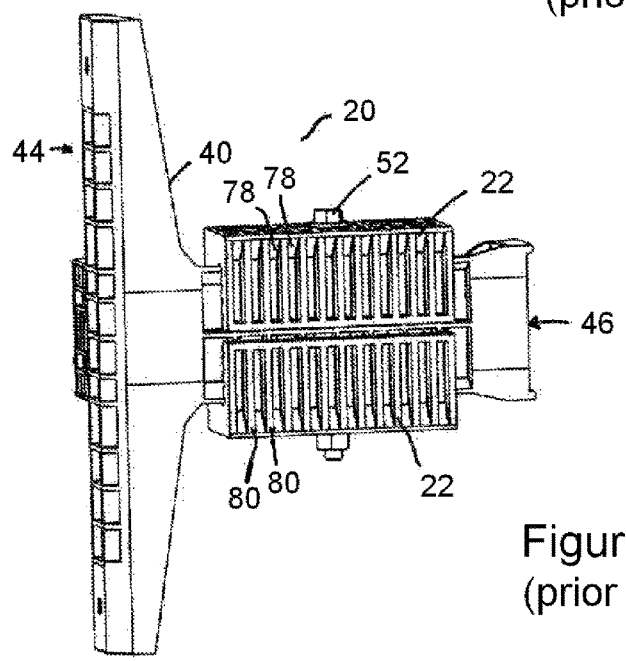

Referring now to FIGS. 1 to 6, it will be seen that a clamp assembly 20 in keeping with the prior art, as described in U.S. Pat. No. 8,608,122, comprises the assembly of three major components. They are a pair of side blocks 22 (see FIGS. 1 and 2), and a single clamping block 40 (see FIG. 3). When assembled as shown in FIGS. 4 and 5, it can be appreciated that the assembly is, to all intents and purposes, monolithic.

As was described in U.S. Pat. No. 8,608,122, the entire clamp assembly 20 can be effected merely by the placement and tightening of one single bolt 52. It will also be appreciated, therefore, that placement and then securement of the clamp assembly 20 at the end of an I-beam simply requires that the pieces may either be loosely assembled and put into place, or held or otherwise kept in place while the bolt 52 is put into place.

Now, referring to FIGS. 1 and 2, details of the side blocks 22 will be discussed. It is seen that each side block 22 is formed generally in the shape of an inverted "L". Each of the pair of side blocks 22 has an upper surface 24, an outer side surface 26, and end surfaces 28, all of which are in mutually perpendicular relationship one to another. There is a bottom surface 30 which is parallel to the upper surface 24. A lower clamping surface 32 is parallel to the upper surface 24. There is also an inclined wedge surface 34 which extends downwardly and outwardly from its intersection with the lower clamping surface 32, to its intersection with the bottom surface 30. At least one opening 54, and more preferably, at least two other openings 57, are formed through the leg of the "L", and passes through the thickness thereof between the respective side surface 26 and inclined wedge surface 34 of each of the side blocks 22.

The prior art clamping block 40 is shown in FIG. 3, and the clamping block 40 is formed generally in the shape of a "T". The central body of this prior art clamping block 40 is designated as 42, and a flat surface which extends across the head of the "T" is designated at 44. It is seen that the central body 42 and the flat surface 44 are typically, essentially perpendicular one to the other. There is an inner surface 46 which is at the foot of the "T", and the inner surface 46 is also essentially perpendicular to the central body 42. A bottom surface 48 is found at least below the leg of the "T", and is also parallel to central body 42.

The clamping block 40 is particularly characterized by the presence of a pair of sloping wedge surfaces 50 which are preferably formed along at least a portion of central body the sides of the leg of the "T", at the sides thereof. Each sloping wedge surface slopes downwardly and inwardly from its respective intersection with the upper surface of central body 42 to its respective intersection with the bottom surface 48.

It is possible that the distance or height between the top and bottom surfaces of clamping block 40 may be sufficiently small so that the bottom surface 48 is disposed above the bolt 52 when it is in place. However, more typically there is at least one opening 55, and more preferably three openings 55, which are formed through the width of the leg of the "T" of the clamping block, so as to pass therethrough from one side to the other. Any one of the openings 55 is such as to accommodate a bolt 52 when it is passed therethrough.

In any event, when the side blocks 22 and the clamping block 40 are assembled together with the bolt 52, and are placed so that the respective lower clamping surfaces 32 of the pair of side blocks 22 faces a respective upper surface of the pair of opposed flanges of the I-beam, the respective inclined wedge surfaces 34 of the side blocks 22 will face respective sloping wedge surfaces 50 of the clamping block 40. Tightening of the bolt 52 which is passed through a combination of openings 54 and 57 (and preferably 55 when present,) will cause a sliding and wedging action of the sloping wedge surfaces 50 of the clamping block 40 relative to and in opposition to the inclined wedge surfaces 34 of the respective side blocks 22. Thus, a clamping action is secured between the side blocks 22 and through the width of the leg of the "T" of the clamping block 40, which clamping action secures the clamp assembly 20 in place on the opposed lower plate portions of the I-beam 60. Still further, a clamping action is induced between the upper surface 42 of the clamping block and the bottom surface 62 of the respective I-beam 60 to which the clamp assembly is attached. In this fashion, I-beams having different widths and thicknesses can be accommodated using clamp assembly 20.

Further, clamping block 40 also optionally additionally includes a second planar face 45 which is essentially co-planar with outer surface 44. Second planar face 45 extends downwardly from block 40, and includes slots, or openings 47, which can be used as additional or replacement attachment points to attach panel 15 to clamping block 40. This is particularly desirable when I-beams 60 of different depths are used, so that openings 64 in adjacent clamping assemblies are not in horizontal alignment. Planar face 45 might also be inwardly inclined away from face 44, if desired.

Figure 6:
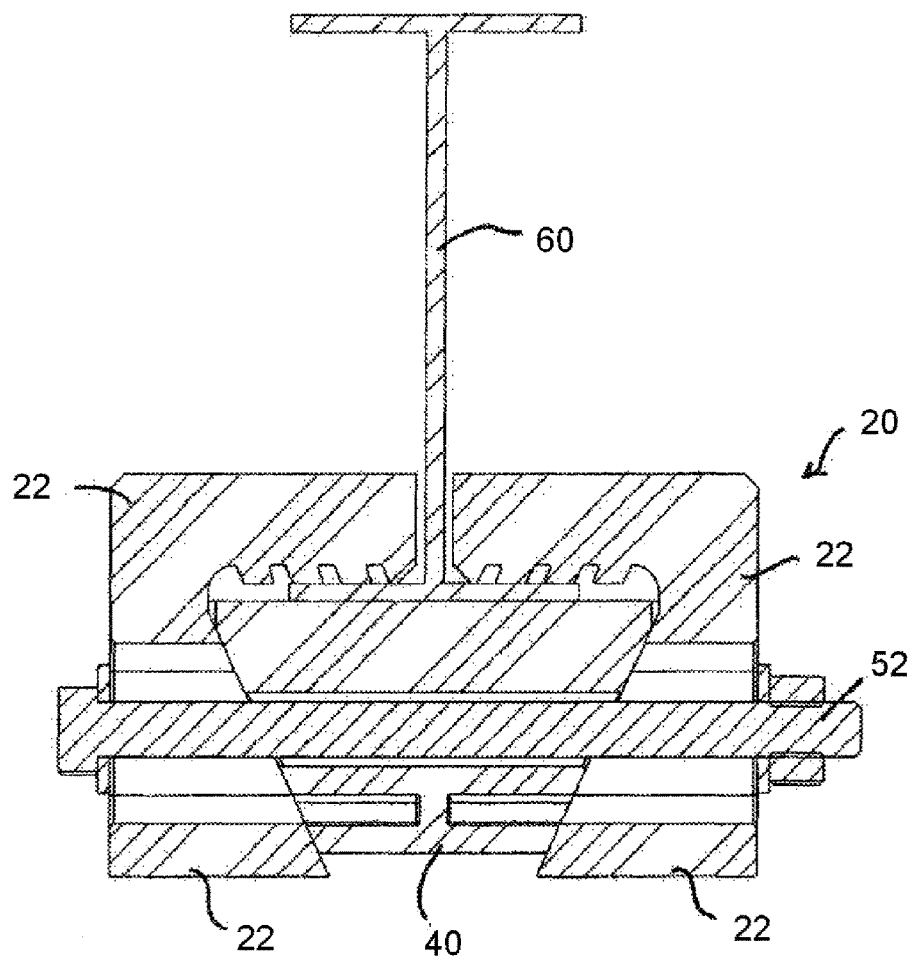
FIG. 6 is a cutaway side view of the clamping assembly of the prior art, attached to an I-beam.

In FIGS. 4 and 5, and in particular in FIG. 6, it can more clearly been seen that a single bolt 52 is used to clamp side blocks 22 to clamping block 40, in position on the lower, flat portion of I-beams 60. It can be seen that tightening of bolt 52 causes not only side blocks 22 to clamp against block 40, but the sloping wedge surfaces 50, and the inclined wedge surfaces 34, also cause side blocks 22 to compress against I-beam 60, and thus lock clamping assembly 20 in place.

Also in FIG. 6, it can be seen that the inclined wedge surfaces 34, and sloping wedge surfaces 50 preferably are machined so as to have corresponding angles, and thus, be essentially flat and square to one another in use. Typically, the wedge surfaces are at between 15 to 45° relative to a vertical line, and more preferably, between 20 and 30° to a vertical line. A series of corrugations 66 is also preferably formed or provided on each lower clamping surface 32 of each of the side blocks 22. The purpose of these corrugations 66 is provide additional grip on I-beam 60.

It will be noted that the various components are typically injection moulded having a plurality of recesses 78 formed therein. Accordingly, a plurality of ribs 80 is created between the recesses 78. This manufacturing technique has the advantage that the weight of the injection moulded side blocks 22 and clamping block 40 will be reduced, while at the same time their rigidity in a direction parallel to the respective ribs will be increased.

Typically, and as can be appreciated from a cursory inspection of FIGS. 4, 5 and 6, and as seen in U.S. Pat. No. 8,608,122, clamping block 40 is disposed in a generally horizontal disposition which extends along I-beam 60. As such, clamping block 40 is generally supported and braced by I-beam 60.

It should be particularly noted that in this prior art embodiment, flat surface 44 is disposed in a perpendicular disposition with respect to the central body, and thus perpendicular to the attachment I-beam.

It will be further understood that the clamp assembly 20 of the prior art, is such that a fairing panel can be secured to an I-beam in such a manner that the plane of the fairing panel and the longitudinal axis of each I-beam 60 to which it is attached, are substantially perpendicular, one to the other.

It will also be clear that struts, straps, or any other fairing securing devices, can be attached to the clamping assemblies, in the manner described in U.S. Pat. No. 8,608,122.

Figure 7:
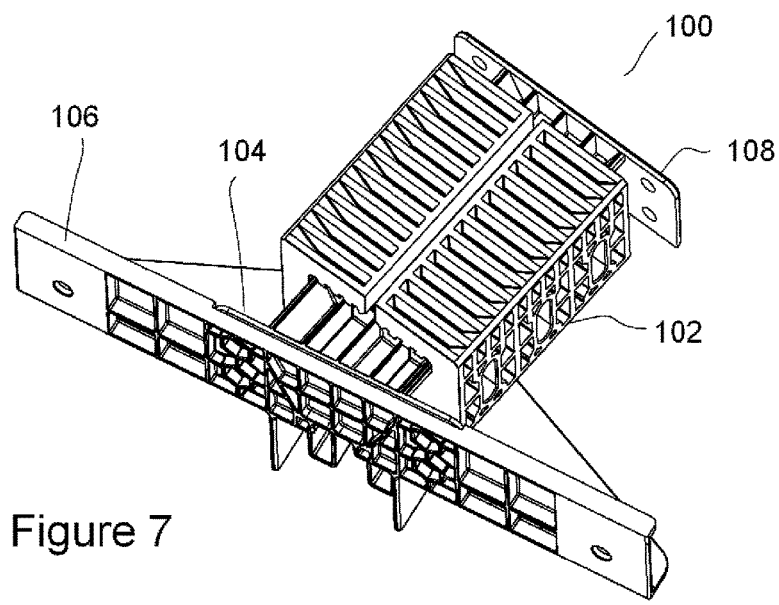
FIG. 7 is a perspective view of a clamping block of the present invention.
Figure 8:
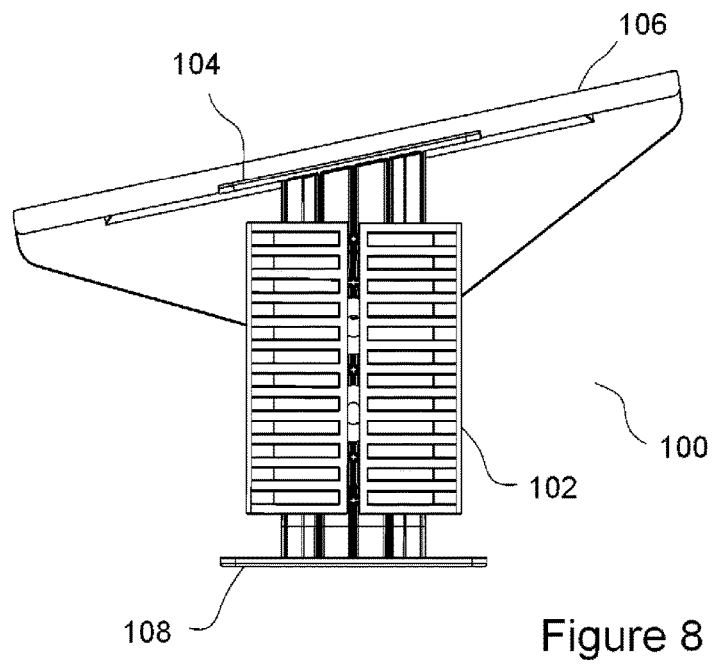
FIG. 8 is top view of the clamping block of FIG. 7.

In FIGS. 7 and 8, a clamping block 100 in accordance with the present invention is shown, which clamping block 100 is used as a replacement for clamping block 40 of the prior art. Clamping block 100 has a central body 102, and at surface 104 at one end of the central body. Flat surface 104 is fabricated at an angle of 15° to the axis of the central body 102. A fairing attachment surface 106 is attached to flat surface 104, and thus, the central body can be attached to a fairing at approximately 15° to the axis of the central body 102, and the overall clamping assembly.

At the other end of central body 102 is a second flat end 108, which is essentially at 90° to the axis of the central body 102. If desired, this end 108 could be used to provide a perpendicular flat surface to which an attachment surface could be attached.

Figure 9:
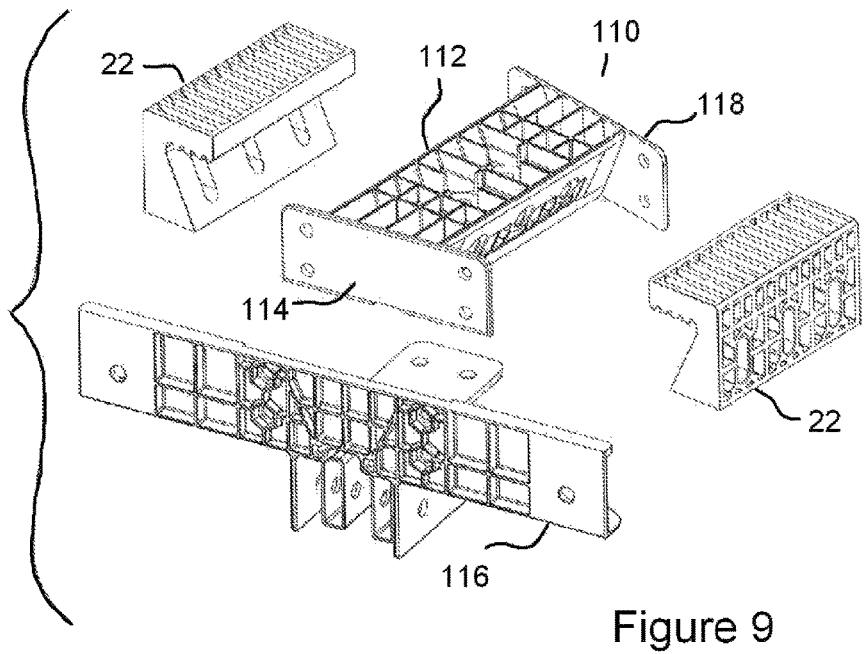
FIG. 9 is a exploded perspective view of a clamping assembly of the present invention, with a clamping block of the present invention, wherein an attachment surface is attached to the flat surface of the clamping block.
Figure 10:
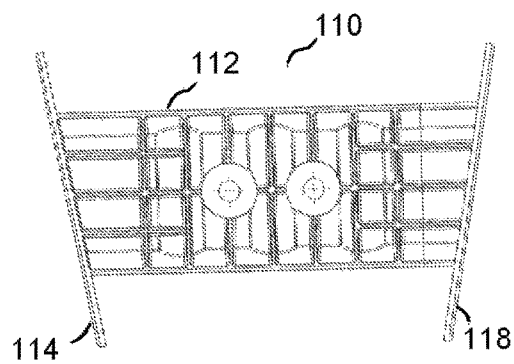
FIG. 10 is a top view of a clamping block of the present invention wherein both ends of the central body have angled flat surfaces.

More preferably however, as shown in FIG. 9, both ends 114 and 118 of clamping block 110 are provided at a 15° angle to the central body 112 of clamping block 110. By providing flat surfaces at the same angle, but opposing angles, at each end of central body 112, clamping block 110 is reversible in the clamping assembly, and thus, the clamping assembly can be used on either the right or left side of the trailer.

Thus, it is apparent that there has been provided, in accordance with the present invention, a clamping assembly which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Thus, the word "comprise", and variations such "comprises" or "comprising", will be understood to imply the inclusion of a stated integer or step or group of integers or steps, but not to the exclusion of any other integer or step or group of integers or steps.

Further, the invention illustratively disclosed herein suitably may be practiced in the absence of any element which is not specifically disclosed herein.

Moreover, the words "substantially", "essentially", "typically", "generally" or the like, when used with an adjective or adverb is intended to enhance the scope of the particular characteristic; e.g., "substantially planar" is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

Other modifications and alterations may be used in the design and manufacture of the apparatus of the present invention without departing from the spirit and scope of the accompanying claims.

I claim:

1. A clamp assembly for securing a panel to an I-beam by a wedging action between side blocks and a clamping block, wherein said clamping block comprises a central body having first and second ends, an upper surface, side surfaces, and a bottom surface, and having a first flat surface at the first end and a second flat surface at the second end of the central body, and the first flat surface extends across the first end of the central body and the second flat surface extends across the second end of the central body, and which flat surfaces act as attachment points for attachment of a panel to the clamp assembly, wherein said first and second flat surfaces are each disposed in a perpendicular disposition, in a vertical direction, with respect to the central body, so as to provide vertically perpendicular face surfaces, with respect to the I-beam, and said first and second flat surfaces are also angled at a non-perpendicular angle, in a horizontal direction, with respect to the central body, so as to provide non-perpendicular angles between each of the first and second flat surfaces and the central body, the first flat surface is at a first non-perpendicular angle to the central body and the second flat surface is at a second non-perpendicular angle to the central body and the I-beam, and the first non-perpendicular angle is equal to the second non-perpendicular angle but in an opposite direction, and thus said first and second flat surfaces are each additionally configured to be horizontally angled at a non-perpendicular angle, to the I-beam.

2. A clamp assembly as claimed in claim 1 wherein said first and second flat surfaces are each horizontally angled at an angle of between 5° to 75° to the central body.

3. A clamp assembly as claimed in claim 2 wherein said first and second flat surfaces are each horizontally angled at an angle of between 7.5° to 60° to the central body.

4. A clamp assembly as claimed in claim 3 wherein said first and second flat surfaces are each horizontally angled at an angle of between 10° to 45° to the central body.

5. A clamp assembly as claimed in claim 1 wherein said side blocks additionally comprise a series of corrugations provided on each lower clamping surface of each of the side blocks to aid in securing the side blocks to the I-beam.

6. A clamp assembly as claimed in claim 1 wherein said central body has a pair of sloping wedge surfaces along the side surfaces of the central body, and each of the sloping wedge surfaces slopes downwardly and inwardly along at least a portion of the length of the central body, from said sloping wedge's intersection with the upper surface of the central body to a respective intersection with the bottom surface thereof, and wherein each of the side blocks are each in the shape of an inverted "L", and each has a side block upper surface, side block outer side surfaces, and side block end surfaces, all in mutually perpendicular relationship to one another, and a side block bottom surface which is parallel to the side block upper surface, and which includes a lower clamping surface which is parallel to the side block upper surface, and wherein each of side block includes an inclined wedge surface extending downwardly and outwardly from said inclined wedge surface's intersection with the lower clamping surface to said inclined wedge surface's intersection with the side block bottom surface.

7. A clamp assembly as claimed in claim 6 wherein each side block and optionally the central body, has at least one set of aligned openings, which is or which are formed through the side block and the central body so that the inclined wedge surfaces of the side blocks act on the sloping wedge surfaces of the central body to create a wedging force that clamps the clamp assembly, and wherein a single bolt is provided to attach the clamping assembly to the I-beam.

8. A clamp assembly as claimed in claim 7 wherein said bolt is tightened so as to create the wedging action that securely attaches the clamping assembly to the I-beam.

9. A clamp assembly as claimed in claim 1 wherein said flat surface extends beyond the side surfaces of the central body.

10. A clamp assembly as claimed in claim 1 wherein said clamp assembly additionally includes an attachment surface which can be attached to the first or second flat surface at either the first or second end of the central body.

11. A clamp assembly as claimed in claim 1 additionally comprising a resiliently flexible strut as a panel support device.

12. A clamp assembly as claimed in claim 1 wherein said panel is a fairing.

13. A fairing mounting system comprising a plurality of clamp assemblies as claimed in claim 11 in combination with a panel, which system is adapted to be mounted to a plurality of I-beams on a cargo trailer.

* * * * *